United States Patent [19]

Simons

[11] Patent Number: 5,461,349
[45] Date of Patent: Oct. 24, 1995

[54] DIRECTIONAL COUPLER TAP AND SYSTEM EMPLOYING SAME

[76] Inventor: Keneth A. Simons, 2935 Sycamore Rd., Huntingdon Valley, Pa. 19006

[21] Appl. No.: 324,239

[22] Filed: Oct. 17, 1994

[51] Int. Cl.[6] .................................................. H01P 5/18
[52] U.S. Cl. .......................................... 333/109; 333/112
[58] Field of Search ................................. 333/109, 112, 333/118, 130, 24 R

[56] References Cited

U.S. PATENT DOCUMENTS

| | | | |
|---|---|---|---|
| 2,148,098 | 2/1939 | Bowman-Manifold | 333/130 |
| 2,950,449 | 8/1960 | Alford | 333/11 |
| 3,048,798 | 8/1962 | Simons | 333/10 |
| 3,416,102 | 12/1968 | Hamlin | 333/10 |
| 3,440,571 | 4/1969 | Simons | 333/10 |
| 3,452,301 | 6/1969 | Cappucci et al. | 333/10 |
| 3,543,222 | 11/1970 | Rheinfelder | 339/99 |
| 3,550,042 | 12/1970 | Werlau | 333/10 |
| 3,611,123 | 10/1971 | Mauw et al. | 333/112 X |
| 3,701,057 | 10/1972 | Hoer | 333/112 |
| 3,798,574 | 3/1974 | Workman | 333/10 |
| 3,800,218 | 3/1974 | Shekel | 324/57 |
| 3,900,805 | 8/1975 | Stevens | 333/10 |
| 3,934,213 | 1/1976 | Stuckert | 333/112 |
| 4,011,528 | 3/1977 | Podell et al. | 333/10 |
| 4,121,180 | 10/1978 | Greenway | 333/10 |
| 4,467,293 | 8/1984 | Apel | 333/112 |
| 4,481,641 | 11/1984 | Gable et al. | 375/7 |
| 4,578,702 | 3/1986 | Campbell, III | 358/86 |
| 4,755,776 | 7/1988 | Preschutti | 333/100 |
| 4,774,481 | 9/1988 | Edwards et al. | 333/127 |
| 5,132,645 | 7/1992 | Mayer | 333/109 |
| 5,304,961 | 4/1994 | Dydyk | 333/112 |

Primary Examiner—Paul Gensler
Attorney, Agent, or Firm—Synnestvedt & Lechner

[57] ABSTRACT

A lumped element directional coupler tap is disclosed especially adapted for a system providing bi-directional communications. The directional coupler tap includes three resistors and a balun. A radio frequency signal may be tapped off of a main transmission line to feed a plurality of branch lines as in a cable television system. The coupler exhibits a high degree of isolation between tap and load ports, and good performance over an usually broad frequency range.

20 Claims, 8 Drawing Sheets

DIRECTIONAL COUPLER TAP AND SYSTEM EMPLOYING SAME

FIELD OF THE INVENTION

The present invention relates to a directional coupler and more particularly to a broadband directional coupler tap with resistive elements.

BACKGROUND OF THE INVENTION

The tapping or diversion of a portion of the electromagnetic energy in a main or primary transmission line is a well-known problem. For example, with cable television systems, the main transmission line runs along a street. Each subscriber along the street who desires cable TV has a branch line coming into the subscriber's house which is tapped off of the main transmission line. (In the cable television (CATV) industries, the main type of transmission line used is coaxial cable.)

Directional coupler taps accept a signal coming from the source port or head end and pass the signal through to a load port while diverting part of the signal to a branch line. The directional coupler discriminates against signals which travel in the opposite direction; that is, signals entering the load port are prevented from being passed through to the branch port, and signals entering the branch port are prevented from being passed through to the load port.

A drawback of previous directional coupler taps is that they operate over a relatively narrow frequency range. This problem is especially acute at very high frequencies. Many directional couplers include transformers in their design. The major factor limiting the upper frequency limit of couplers now in use is the difficulty of maintaining pure inductive coupling at high frequencies.

Another drawback of existing directional couplers is that their directivity is relatively poor at higher frequencies. (This is especially critical for applications involving emerging communications systems.) Directivity is a measure of the degree of discrimination of the received power in the branch port when equal power is applied at the source and load ports. There is an increasing need to provide two-way communications to the average home. The characteristics of the directional coupler—including its directivity—determine how the bi-directional signals are handled in such systems. Accordingly, a directional coupler with a high directivity over a broad bandwidth is required.

A representative directional coupler using inductive coupling is disclosed in U.S. Pat. No. 3,048,798, issued Aug. 7, 1962. This coupler, while effective for its originally-intended purposes, does not provide the extremely wide frequency pass band desirable for certain present-day applications. The '798 coupler teaches the use of two cross-connected transformers which provide the necessary inductive coupling.

The '798 coupler works efficiently over the frequency range in which the transformer has nearly pure inductive coupling. However, as is typical of directional couplers which employ transformers, the '798 coupler has extremely poor performance above approximately 700 megahertz.

SUMMARY OF THE INVENTION

The objects and advantages of the subject invention will become apparent after a reading of the following description.

The directional coupler of the present invention has first (source), second (load), and third (tap or branch) ports. Electromagnetic energy over a broad band is bi-directionally coupled between the first and second ports and between the first and third ports. However, there is virtually no coupling between the second and third ports.

The directional coupler of this invention includes a circuit having three resistors and a means for inducing a high impedance in series with the shield of the second or load line. A first resistor of known value is connected between a first terminal and a second terminal. Second and third resistors of known values are connected between the second terminal and a third terminal, and between the third terminal and a fourth terminal, respectively.

An input connector is connected across the first and fourth terminals for accepting electromagnetic energy from a first transmission line. A tap-out connector is connected across the second terminal and the fourth terminal for connection to a branch transmission line. A balun is connected across the third terminal and the fourth terminal for providing a high impedance, relative to the impedance of the third resistor. An output terminal is connected to the balun for passing the electromagnetic energy along the primary transmission path and eventually to the load.

In the preferred embodiment, the resistance value of the resistor between the second and third terminals is equal to the nominal transmission line impedance. In addition, the resistance value of the resistor across the first and second terminals is equal to a value "N" times the value of the resistance between the second and third terminals, where "N" is a design parameter and determines the tap loss. Finally, the resistance between the third and fourth terminals is equal to the resistance across the second and third terminals divided by "N".

A major feature of this circuit is its high directivity over a broad frequency range. That is, signals entering from the load port are isolated from the branch port and signals entering from the branch port are isolated from the load port. The utilization of resistive elements gives the present directional coupler relatively uniform frequency characteristics compared to directional couplers using inductive elements. Therefore, the loss characteristics and the directivity can be made uniform over a much wider range of frequencies. This feature makes the instant directional coupler ideal for two-way communications since any signal traveling back to the source from the load or from the branch line will not interfere with subscribers at another branch port.

DETAILED DESCRIPTION OF THE PREFERRED EMBODIMENT

Figure 1:
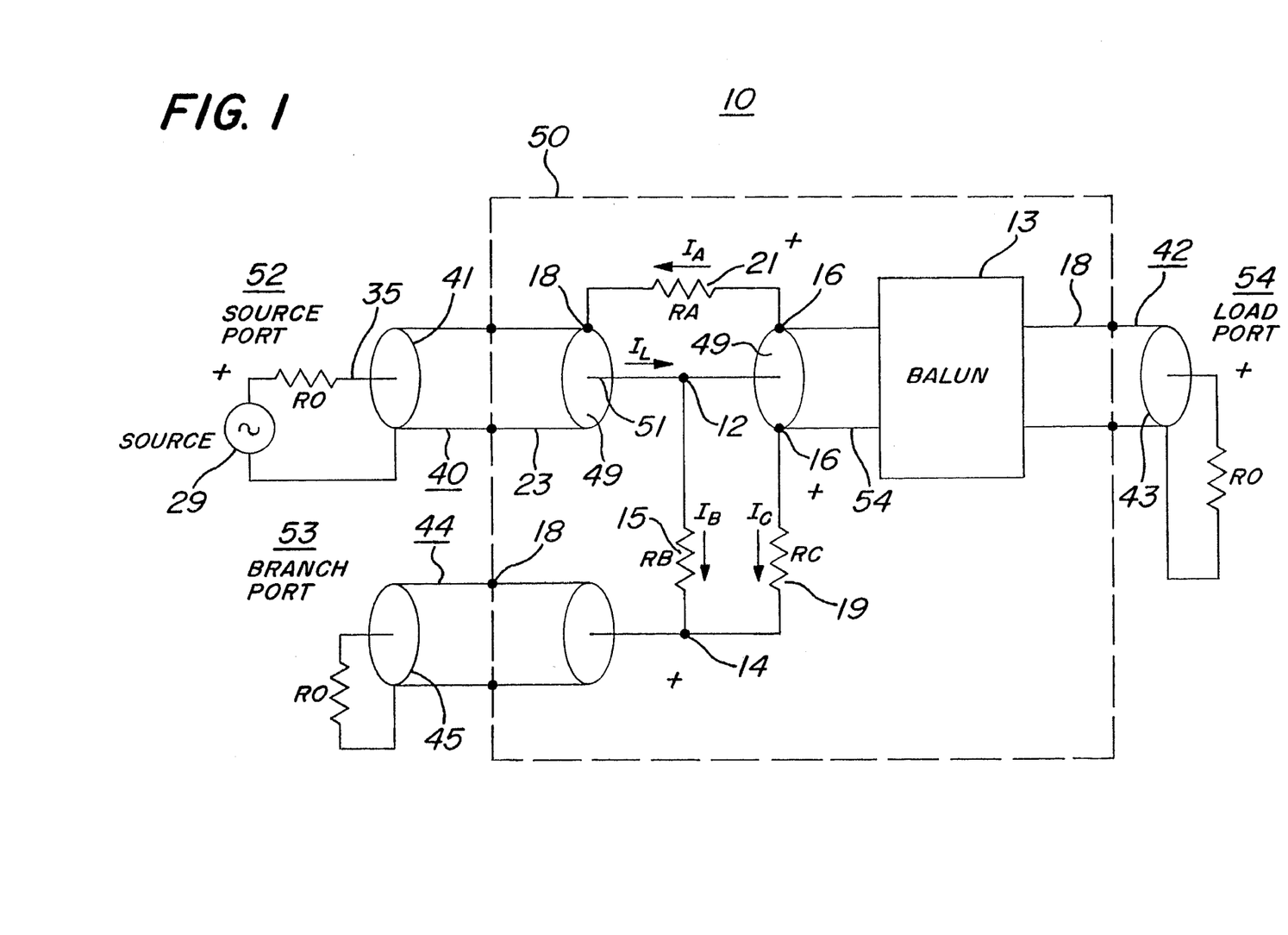
FIG. 1 is a schematic block diagram of the directional coupler tap in accordance with the present invention showing the direction of the currents when a signal is introduced at the source port.

Referring to the drawings, the directional coupler tap according to the present invention is generally referred to as 10. FIG. 1 is a schematic circuit diagram of the directional coupler 10 in its most basic form. Since it is contemplated that the most common application of the instant directional coupler is in association with cable television systems, the preferred embodiment has been designed for use with unbalanced transmission lines, and specifically with coaxial cables 40, 42 and 44.

A lumped element circuit effectively includes four terminals and lumped components of known values between each terminal. A resistor 15 having a known resistance of value $R_B$ is connected between a first terminal 12 and a second terminal 14. A resistor 19 having a known resistance of value $R_C$ is connected between the second terminal 14 and a third terminal 16. A resistor 21 having a known resistance of value $R_A$ is connected between the third terminal 16 and a fourth terminal 18. A high-impedance means induces a high impedance (relative to the resistors) across the third terminal 16 and the fourth terminal 18.

The directional coupler 10 is usually shielded by placing the lumped element circuit inside an electrically conductive enclosure. In the preferred embodiment, the enclosure is a metallic box 50 (e.g. aluminum, steel, etc.) having at least one removable side which allows access to the lumped element circuitry. The outer conductor or shielding 41 of the incoming primary transmission line 40, the shielding 43 of the outgoing primary transmission line 42 and the shielding 45 of the branch transmission line 44 are electrically connected to the metallic box 50, and are introduced into the box 50 in such a way that complete shielding is maintained.

Figure 2:
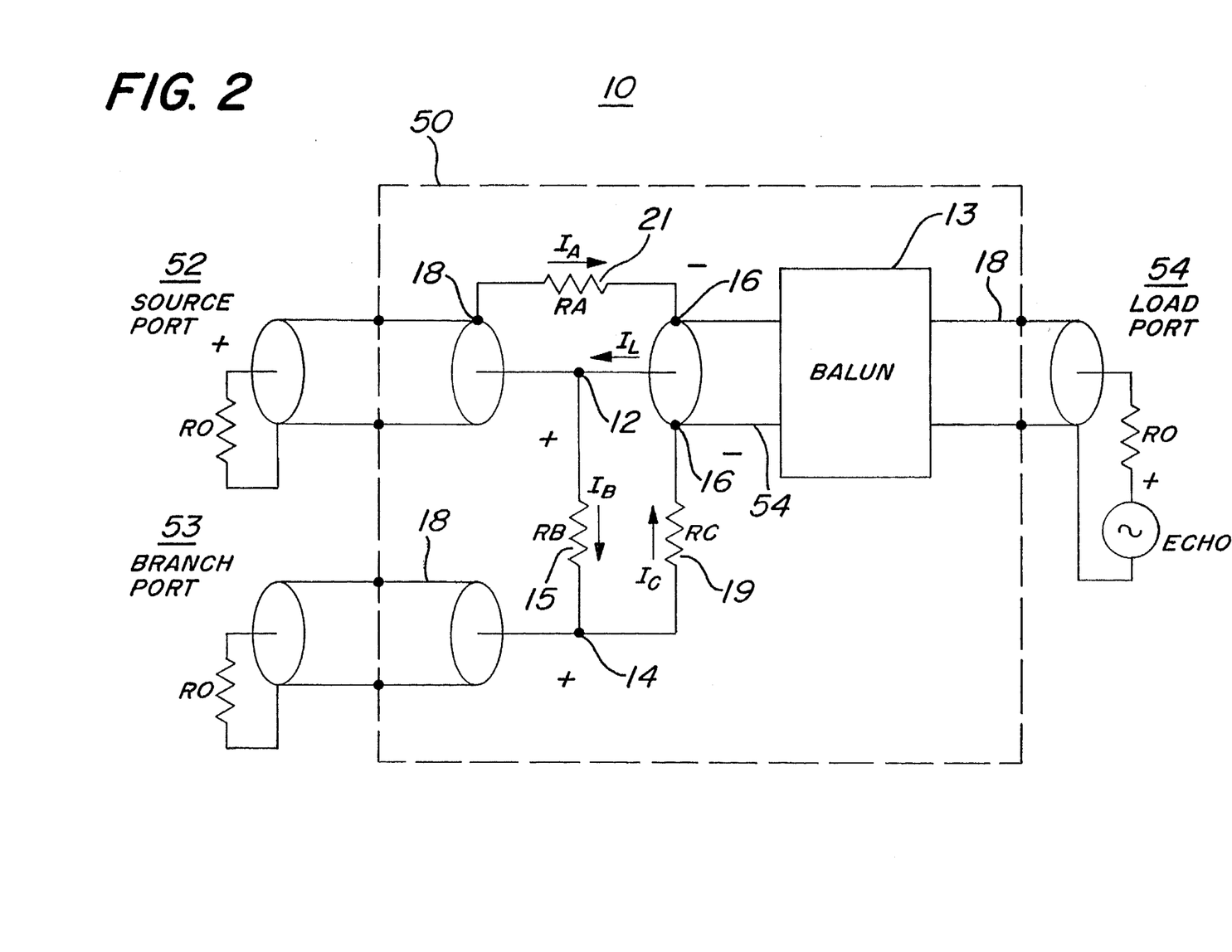
FIG. 2 is a schematic block diagram of the directional coupler tap of FIG. 1 showing the current flow when a signal is introduced at the load port.

Although the directional coupler can be implemented without cutting the central conductor of the primary transmission line (as shown in FIGS. 1 and 2), one embodiment would contemplate terminating the transmission lines 40, 42 and 44 with connectors (not shown)—e.g., BNC, F-56, F-59, or other compatible types of connectors—and providing mating connectors (not shown) on the metallic box 50 to pass the electromagnetic energy to and from the directional coupler 10. An inner conductor 51 of the transmission line (or of an input connector) effectively forms the first terminal 12. The shielding 41 of the primary transmission line (or the shielding of the input connector) effectively forms the fourth terminal 18. In this manner, the first transmission line 40 delivers the electromagnetic energy to the directional coupler 10 from a source 29 (e.g., a cable television operator).

In the preferred embodiment, the high-impedance means is a balun 13, having a known impedance of $Z_D$. The impedance $Z_D$ is a function of frequency. At relatively high frequencies, the impedance $Z_D$ is very nearly a resistance; at lower frequencies, the inductive portion L of $Z_D$ becomes significant.

Figures 4A, 4B, 5A, 5B:
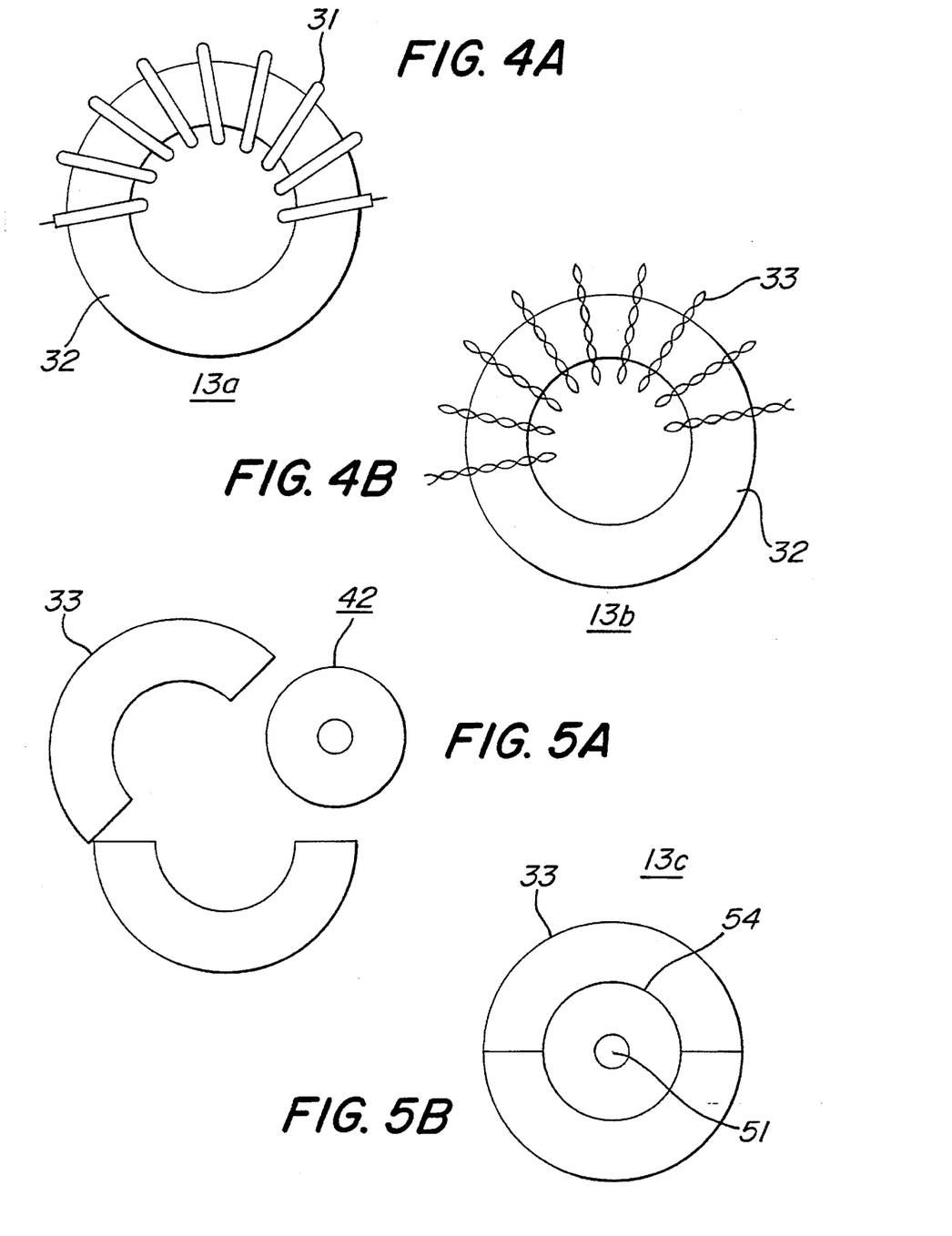
FIGS. 4A and 4B are enlarged top views of two kinds of balun that could be used with the subject directional coupler tap.
FIGS. 5A and 5B are enlarged side views of another balun which can be used with the instant directional coupler circuitry by clamping directly over a coaxial cable.

Three different kinds of balun, which can be used in connection with the present invention, are shown in FIGS. 4A, 4B, 5A, 5B and 6. The first balun 13a is constructed by wrapping a flexible copper-shielded coaxial cable 31 around a ferrite core 32, as shown in FIG. 4A. Alternatively, balun 13b, as shown in FIG. 4B, is made by wrapping an insulated twisted-pair of wires 33 around a ferrite core 32. The impedance $Z_D$ of both baluns 13a and 13b increases as the number of turns increase.

Figure 6:
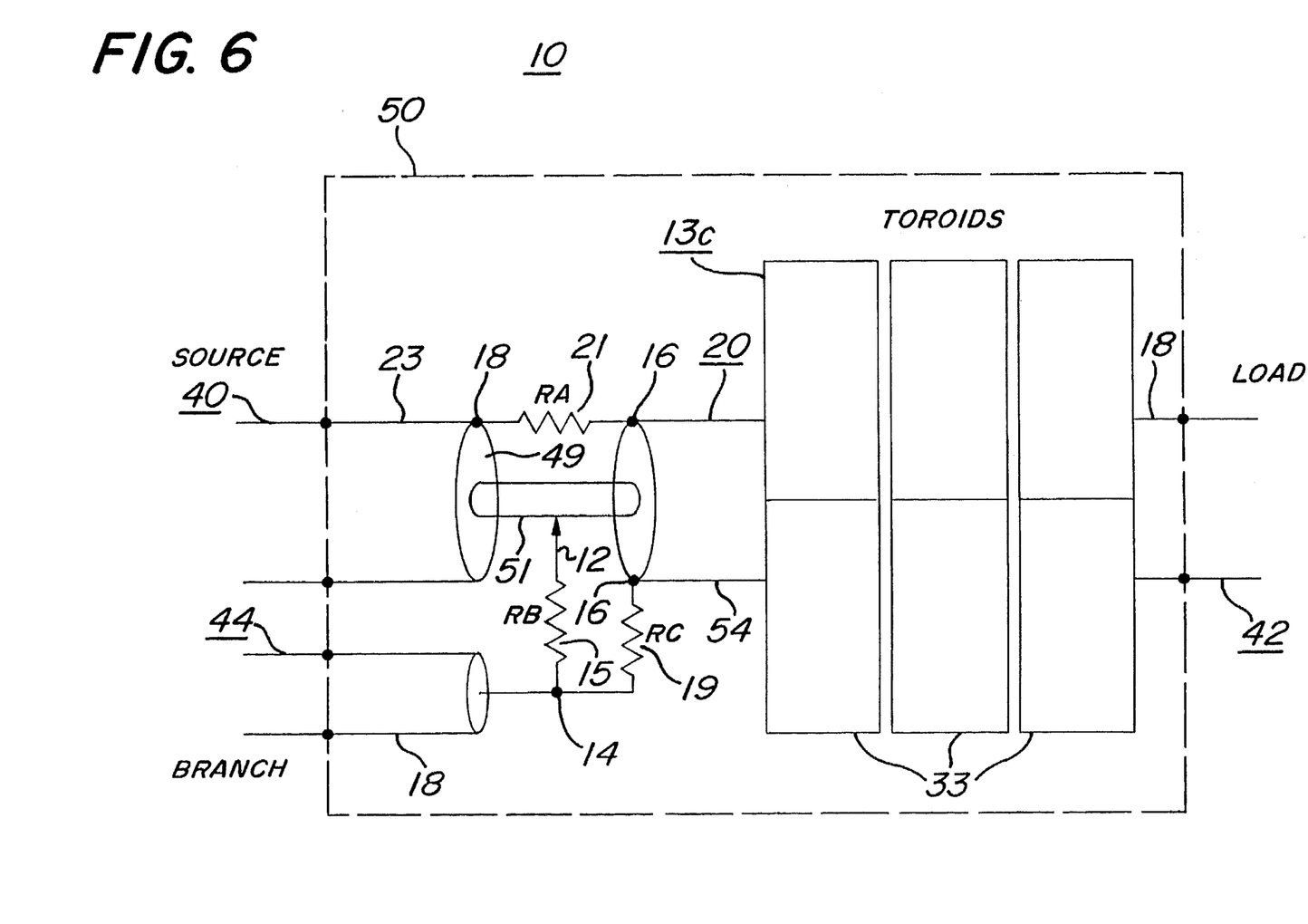
FIG. 6 shows a block diagram of a directional coupler formed by cutting the outer conductor of the main cable and clamping ferrite toroids as shown in FIGS. 5A and 5B.

The third type of balun 13C, is shown in FIGS. 5A and 5B and is ideally used when there is a need to keep the inner conductor 51 of the primary transmission line intact. As shown in FIG. 6, the outer conductor 23 of the incoming primary transmission line 40 is cut, along with the insulating material 49, to expose the center conductor 51. Ferrite toroids 33 are split in half (see FIG. 5A) and clamped over the coaxial cable which forms the outgoing portion of the transmission line 20, which eventually forms the load transmission line 42. The ferrite toroids 33 are positioned to surround the outer conductor 54 of the outgoing portion 20 of the primary transmission line 40 which leads to the load port. The impedance $Z_D$ of the balun will increase with the number of toroids 33.

The resistor 15, could make contact with the center conductor in a manner similar to that used by earlier "pressure taps". This arrangement would have the advantage that both the outer conductor 43 and the center conductor 51 would be continuous for any DC or power frequency currents that might be present. (The metal case 50 provides a DC connection for the outer conductor.) This would make it ideal for use in existing cable TV systems.

The characteristic impedance $R_O$ of the coaxial cable transmission line 40 is usually seventy-five ohms (75 Ω). The value of resistor 19 ($R_C$) between the second terminal 14 and the third terminal 16 should match the characteristic impedance $R_O$ of the first transmission line 40. In practice, $R_C=R_O=75$ Ω. Resistor 15 ($R_B$) should equal an arbitrary factor "N" times $R_O$; and $R_A$ should equal $R_O$ divided by "N". The factor "N" determines the tap loss and usually has a value between 1 and 30.

With these conditions, the resistance between the first terminal 12 and the fourth terminal 18 is equal to $R_O$ for all values of "N" and the voltage between the second terminal 14 and the third terminal 16 is zero. The voltage between the second terminal 14 and the fourth terminal 18 is the tap voltage; the voltage between the first terminal 12 and the third terminal 16 is the line voltage.

Referring again to FIG. 1, the situation for a forward traveling wave, i.e. a signal originating from the incoming primary transmission line 40 and ultimately from a source 29, is illustrated. Voltage polarity and the direction of current flow are shown at the time the source voltage is positive. The line current $I_L$ travels from the source port to the load port. The positive voltage at terminal 12 causes a current $I_B$ to flow from inner conductor 51 through resistor 15 to terminal 14. Current $I_A$ flows from terminal 16 through resistor 21 to terminal 18. The voltage drop across resistor 21 causes a positive voltage at terminal 16, which in turn causes current $I_C$ to flow from terminal 16 through resistor 19 to terminal 14.

The two currents $I_B$ and $I_C$ arriving at terminal 14 are in phase and they are equal because of the resistor values chosen. Therefore, a signal introduced into the directional coupler at the source port 52 results in most of the energy being output at the load port 54, and a portion of the energy output at the branch port 53. The magnitude of the signal output to the branch port 53 is related to the magnitude of the introduced signal and the tap loss factor N.

FIG. 2 shows the identical directional coupler 10 of FIG. 1, when there is a signal traveling along the primary transmission line which is introduced at the load port 54. Once again, there is a positive voltage at terminal 12, but the line current ($I_L$) has reversed direction. Current $I_B$ flows through resistor 15 ($R_B$) toward terminal 14. However, the current $I_A$ has also reversed and the voltage drop across resistor 21 ($R_A$) is negative. Therefore, the voltage at terminal 16 is also negative causing a current $I_C$ to flow through resistor 19 ($R_C$) away from terminal 14. Again, because of the choice of values of the components, the currents $I_B$ and $I_C$ are equal, but since $I_C$ has an opposite direction than when a signal is introduced at the source port there is no net current flow at terminal 14. Therefore, a signal introduced at the load port 54 is passed through to the source port 52 but produces no output at the branch port 53.

Figure 3:
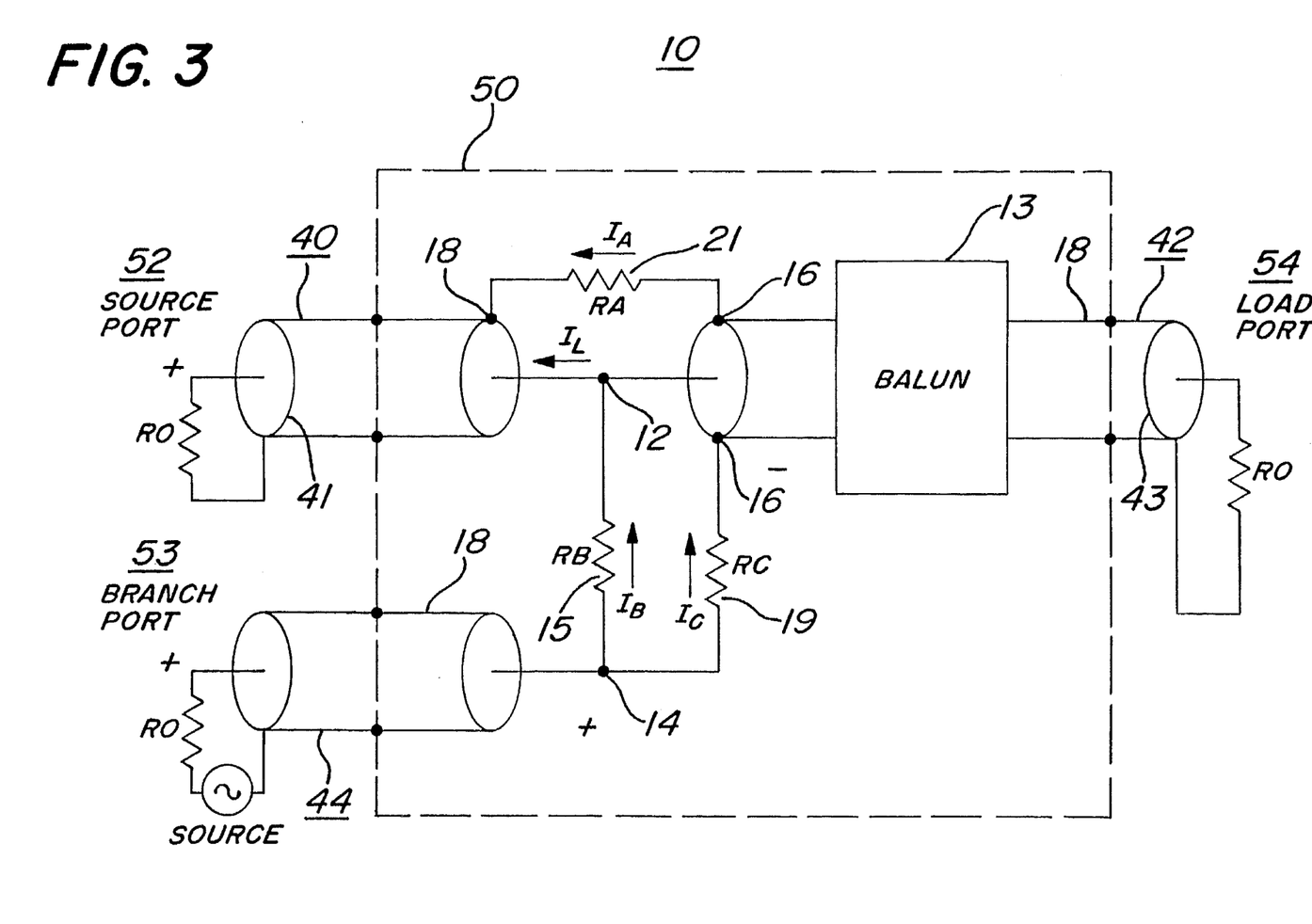
FIG. 3 is a schematic block diagram of the directional coupler tap of FIG. 1 showing the current flow when a signal is introduced at the branch port.

FIG. 3 shows the identical directional coupler 10 of FIG. 1, when there is a signal introduced at the branch port 53. There is a positive voltage at terminal 14 which generates a current $I_B$ through resistor 15 toward terminal 12. Further, current $I_C$ through resistor 19 flows from terminal 14 to terminal 16. Current $I_A$ flows through resistor 21 from terminal 16 to terminal 18. The majority of current $I_B$ flows to the source port 52. Because of the choice of the values of the components, the current $I_C$ and $I_A$ cancel each other out and there is no net current flow at the load port 54. Therefore, a signal introduced at the branch port 53 is passed to the source port 52 but produces no output at the branch port 53. There are two design features which must be kept in mind for a directional coupler. The first is that for a given tap loss (i.e. the ratio of the signal strength of the source port to that of the branch port), the line loss (i.e. the ratio of the signal strength between the load port and source port) shall be as low as possible. Second, the reverse loss from load port to branch port shall exceed the tap loss by as much as possible. The relationship between N and the two losses can be shown mathematically:

Tap Loss (in $dB$)=20 $\log_{10}$ (1+N)

Line Loss (in $dB$)=20 $\log_{10}$ (1+(1/N))

The following table shows typical tap losses and line losses for the present invention for representative values of the tap loss factor N.

| N | Tap Loss (in dB) | Line Loss (in dB) |
|---|---|---|
| 1 | 6.02 | 6.02 |
| 5 | 15.56 | 1.58 |
| 10 | 20.83 | 0.83 |
| 15 | 24.08 | 0.56 |
| 20 | 26.44 | 0.42 |
| 25 | 28.30 | 0.34 |
| 30 | 29.83 | 0.28 |

The older inductively-coupled tap has, theoretically, less through loss than the instant coupler for a given tap loss. In practice the wire and core losses increase the net loss so that, at high frequencies and for tap losses of 20 dB or more the through losses are quite comparable.

Figure 7:
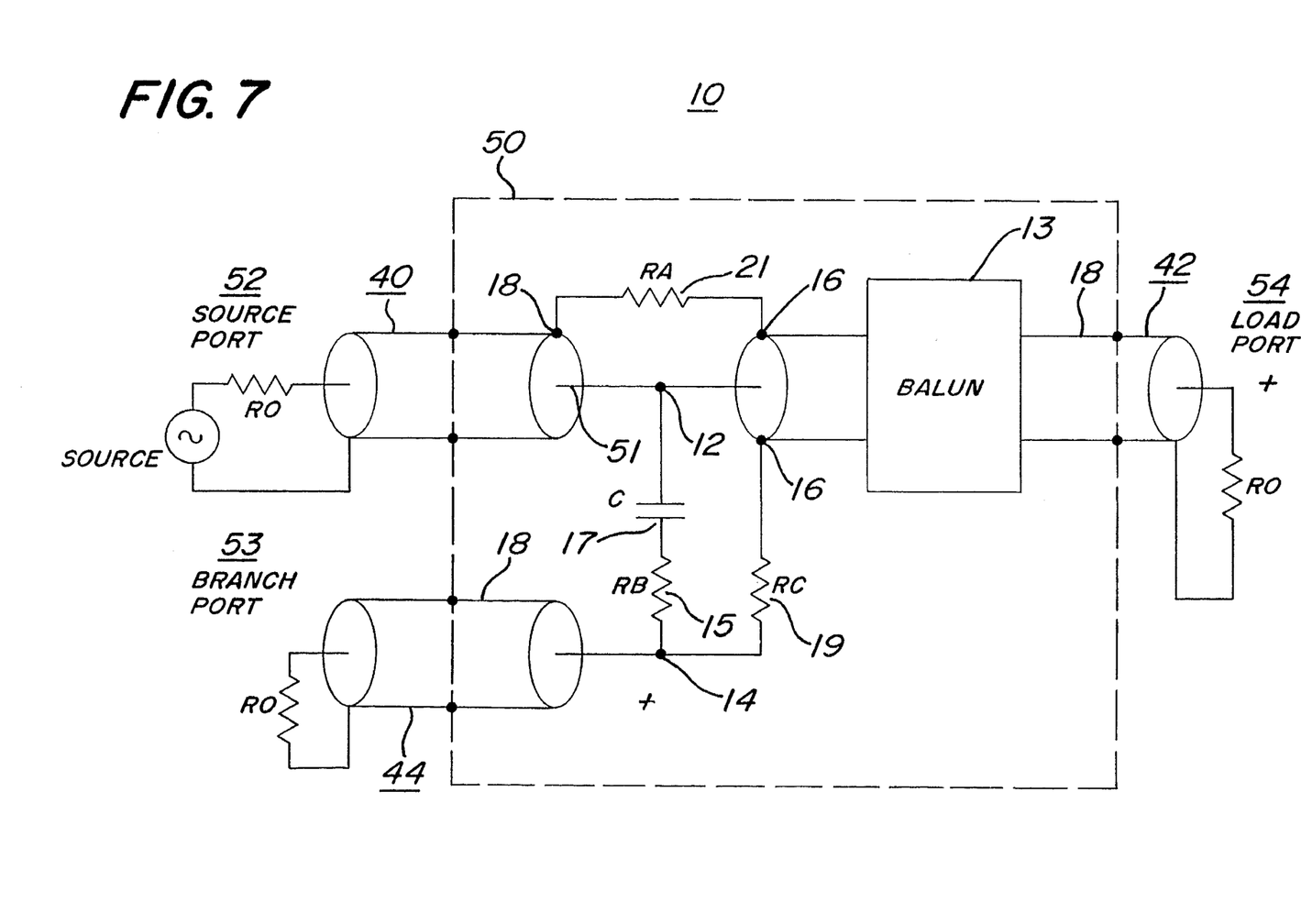
FIG. 7 is a schematic block diagram of the directional coupler in accordance with the instant invention adapted to operate at lower frequencies.

FIG. 7 shows an improved directional coupler circuit which optimizes low frequency performance. Capacitor 17 is placed in series with resistor 15 between terminal 12 and terminal 14.

In order to optimize low frequency directivity, the capacitor 17 having a capacitance of value C is selected such that the two time constants are equal, i.e.:

$$\frac{L}{R} = R_B \times C$$

where R is the resistance value of $R_A$ in parallel with $R_D$; and L is the self-inductance of the balun 13 (the inductive portion of $Z_D$).

For this analysis the impedance $Z_D$ of balun 13 is considered to consist of a resistance $R_D$ in parallel with pure inductance L.

When this condition is met, the forward response is carried to somewhat lower frequencies and the reverse response continues to be effectively zero for all frequencies.

The telephone companies and the advent of direct broadcast satellite services presents a competitive problem for cable television operators. In order to stay ahead of the competition, cable television operators have a need to offer two-way communications over their cable transmission lines. That is, transmission is provided in both directions using only the existing cable systems in place. Accordingly, a device which allows transmission from the subscribers' home to the source, which does not interfere with either signals generated at the source by the cable operator or with signals generated by other subscribers, and which has a wide pass band is required.

The present invention is ideally suited to allow transmission from the branch port to the source port so that the cable operator can receive signals from the subscribers. In addition, the high directivity of the instant invention prevents other subscribers' signals, which would be entering into the directional coupler at the load port, from interfering with signals at the branch port.

One of the advantages of the present directional coupler is its unusually good broadband performance; it has proven adequate from approximately 1 MHz to 1 GHz. By discriminating against signals coming from other cable subscribers and by having a relatively flat response over a broad frequency range, wide-band two-way communication becomes feasible.

Line loss at low frequencies is due to the resistor network; at high frequencies, the resistor network loss is added to the loss of the small coaxial cable in the balun which is generally negligible. In the case of the clamped toroid coupler shown in FIG. 6, there is no added coaxial cable and therefore no such loss. The isolation (or directivity), i.e., the amount by which the loss from Line Out to Tap exceeds that from Line In to Tap is extremely good for the present invention. The loss from Line In to Tap is quite flat from 1 to 1000 Mhz, and the impedance match at the various ports is uniformly better than 20 dB (Return Loss).

Hand-made models have been made, using commercial resistors, which performed well up to 1 GHz. It is anticipated that with refined resistor technique this can be extended as far as 2 GHz.

Figure 8A:
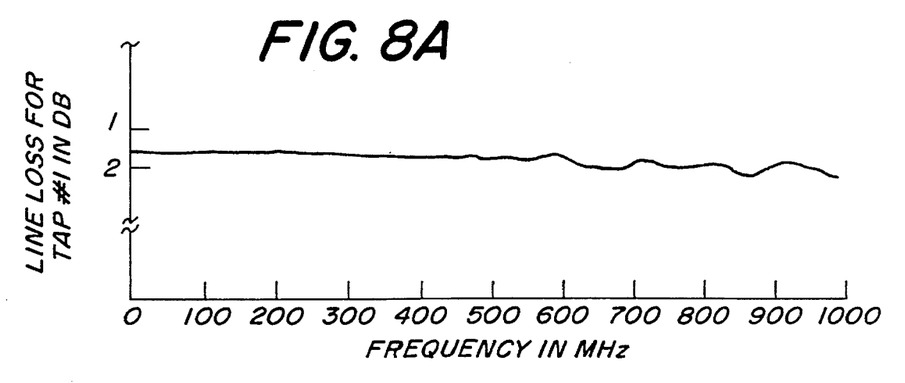
FIGS. 8A, 8B and 8C are graphs of various losses of a particular directional coupler, measured as a function of frequency.
Figure 8B:
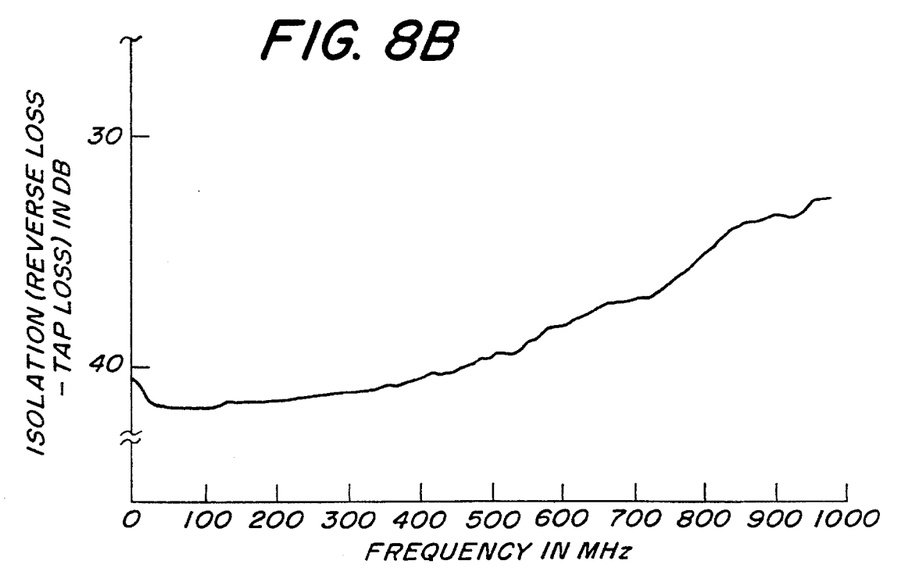
Figure 8C:
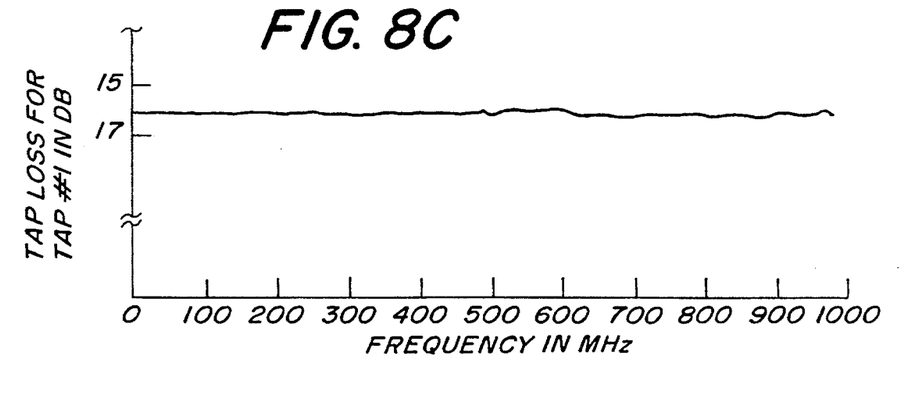

FIGS. 8A through 8C show the measured losses in decibels (dB) for a directional coupler built in accordance with the present design. Referring to FIG. 8A, the line loss for the directional tap is shown. FIG. 8B shows the isolation of the same directional coupler between the branch port and load port. FIG. 8C shows the tap loss which is the loss from the source to the tap. As can be seen, the losses are relatively flat over the entire frequency range up to 1 GHz.

Figure 9:
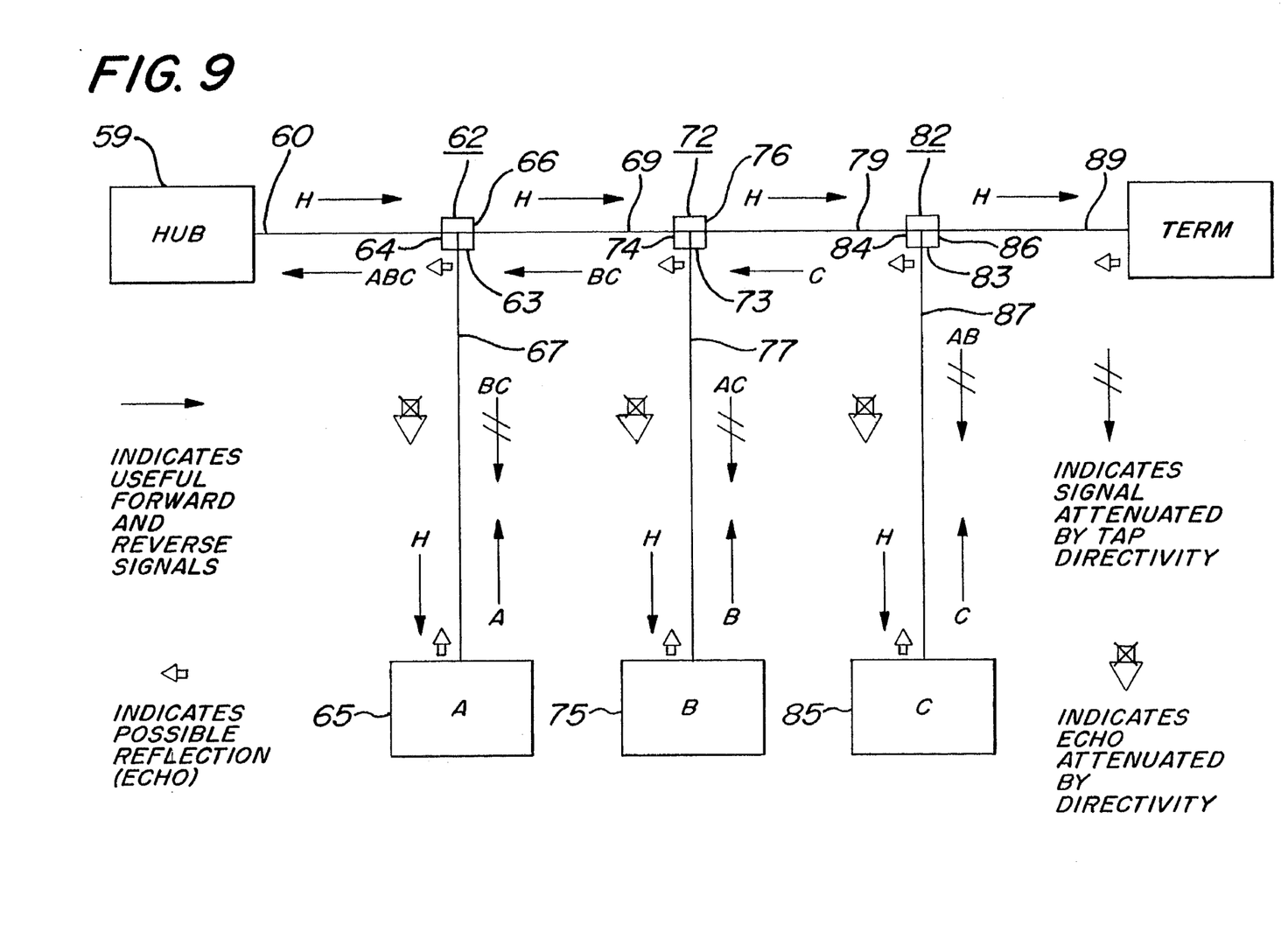
FIG. 9 is a block diagram of a system example utilizing directional couplers in accordance with the present invention.

FIG. 9 shows a schematic block diagram of a typical system utilizing the instant directional coupler. A primary or main transmission line 60 is connected to a source or signal generator, or to a hub 59. The signal H generated at the source or hub travels along the main transmission line 60 to a source port 64 of a first directional coupler 62. The branch port 63 of the first directional coupler 62 is bi-directionally coupled to the source port 64. Accordingly, a portion of the signal H is allowed into a first subscriber's home 65. The source port 64 is bi-directionally coupled to a load port 66 and the main signal H continues on to feed the remainder of the system. However, branch port 63 is not coupled to load port 66.

A subscriber's equipment inside each home 65, 75, 85 may include telephones, computers, stereos, televisions, facsimile machines, etc. Each of these devices may transmit and receive signals over the cable system. The homes are connected to their respective branch transmission lines 67, 77, 87 allowing two-way communication between the hub 59 and the devices in each individual home. A signal originating from the first home 65 is indicated at A. This signal travels back to the branch port 63 of the first directional coupler 62. Because of the isolation characteristics of the directional coupler 62, the signal travels back to the hub 59 for processing or further redistribution. Since the branch port 63 is not coupled to the load port 66, the signal A is prevented from traveling along the first outgoing main transmission line 69 and ultimately cannot be transmitted to branch lines 77 or 87 of couplers 72 and 82.

Similarly, signals B and C coming from second and third homes 76 and 86 respectively, also travel back towards the hub 59. However, directional coupler 72 prevents signal B from travelling along second outgoing transmission line 79 since the branch port 73 is not coupled to the load port 76. Therefore, all signals originating from the home (A, B, C) travel only towards the hub and do not interfere with signals from any homes.

As can be seen, two-way communication can be achieved between the hub and other subscribers.

Even though particular embodiments of the present invention have been illustrated and described herein, this is not intended to limit the invention. It is therefore to be understood that modification and variation of the embodiments described above may be made without departing from the spirit or scope of the invention.

I claim:

1. A directional coupler having at least first, second and third ports for providing bi-directional coupling of electromagnetic energy between the first and second ports, and between the first and third ports, while preventing coupling in either direction between the second and third ports, comprising:
   a.) four terminals, a known resistance of value $R_B$ connected between a first of the terminals and a second of the terminals, a known resistance of value $R_C$ connected between the second terminal and a third of the terminals, a known resistance of value $R_A$ connected between the third terminal and a fourth of the terminals;
   b.) a high-impedance means, having an input, and output and an impedance several magnitudes greater than the impedance of $R_A$, the input of the high impedance means being connected across the third terminal and the fourth terminal, and wherein the first port is connected across the first terminal and the fourth terminal, the second port is connected across the second terminal and the fourth terminal, and the third port is connected to the output of the high-impedance means.

2. The directional coupler of claim 1 wherein the high impedance means is a balun.

3. The directional coupler of claim 2 wherein the balun comprises a section of coaxial cable wound around a ferrite core.

4. The directional coupler of claim 2 wherein the balun comprises ferrite toroids surrounding a section of coaxial cable.

5. The directional coupler of claim 2 further comprising a capacitor of known capacitance value C in series with the resistor $R_B$, the capacitance of the capacitor is selected to compensate for the inductance of the balun thereby improving the low frequency response of the directional coupler.

6. The directional coupler of claim 1 wherein $R_C$ equals the characteristic impedance of transmission lines used to connect and carry the electromagnetic energy to and from the coupler.

7. The directional coupler of claim 6 wherein $R_B = N \times R_C$, and $R_A = R_C \div N$, where "N" is a design parameter and determines tap loss.

8. The directional coupler of claim 7 further comprising a means for shielding the coupler, and for introducing the transmission lines in such a way to minimize leakage.

9. The directional coupler of claim 8 wherein the shielding means is an electrically conductive metallic enclosure.

10. The directional coupler of claim 1 wherein component characteristics have been chosen to maximize the frequency bandwidth over which the directional coupler operates.

11. The directional coupler of claim 1 wherein the first port is ultimately connected to a source via a primary transmission line, the second port is connected to a subscriber device via a branch transmission line and the third port is connected to a load via an outgoing transmission line.

12. A method of manufacturing a directional coupler for coupling a portion of the electromagnetic energy of a primary transmission line to a branch transmission line, and for isolating the branch transmission line from signals in the primary transmission line, comprising the steps of:
   a.) grounding the shield of the primary transmission line and the branch transmission lines;
   b.) breaking the electrical continuity of the shield of the primary transmission line, thereby forming an incoming portion of the primary transmission line having a grounded shield and an outgoing portion having a grounded shield of the primary transmission line, and exposing a center conductor on the primary transmission line;
   c.) connecting a first resistor of known value $R_B$ between the center conductor of the primary transmission line and a center conductor of the branch transmission line;
   d.) connecting a second resistor of known value $R_C$ between the center conductor of the branch transmission line and an ungrounded shield of the outgoing portion of the transmission line;
   e.) connecting a third resistor of known value $R_A$ across the break in the shield of the primary transmission line; and
   f.) placing ferrite toroids over the shield of the outgoing portion of the primary transmission line to form a balun.

13. The method of manufacturing the directional coupler of claim 12 further comprising the step of connecting a capacitor of known capacitance value C in series with the first resistor.

14. The method of manufacturing the directional coupler of claim 12 wherein the resistance value $R_C$ of the second resistor equals the characteristic impedance of the transmission lines.

15. The directional coupler of claim 14 wherein $R_B=N\times R_C$, and $R_A=R_C\div N$, where "N" is a design parameter and determines tap loss.

16. A two-way communication system for connecting subscribers to a service, comprising:

a source for generating signals for use by subscribers of the system;

a primary transmission line connected to the source for carrying the signals;

a directional coupler connected to the primary transmission line;

a branch transmission line connected to the primary transmission line via the directional coupler for carrying the signal to the subscribers;

an outgoing transmission line connected to the primary transmission line via the directional coupler for transmitting the signal to the remaining subscribers;

wherein the directional coupler includes at least source, branch and load ports, for providing bi-directional coupling between the source and branch ports, and between the source and load ports, while preventing coupling in either direction between the branch and load ports, and wherein the primary transmission line connects to the source port, the branch transmission line connects to the branch port and the outgoing transmission line connects to the load port; and wherein the directional coupler comprises:

a.) four terminals, a known resistance of value $R_B$ connected between a first of the terminals and a second of the terminals, a known resistance of value $R_C$ connected between the second terminal and a third of the terminals, a known resistance of value $R_A$ connected between the third terminal and a fourth of the terminals; and b.) a high-impedance means, having an impedance several magnitudes greater than the impedance of $R_A$, wherein an input of the high impedance means is connected to the third terminal and the fourth terminal, wherein the first and fourth terminals comprise the source port, the second and fourth terminals comprise the branch port and an output of the high impedance means comprises the load port.

17. The system of claim 16 wherein the high-impedance means is a balun.

18. The system of claim 17 further comprising a capacitor of known capacitance value C in series with the resistor $R_B$, the capacitance of the capacitor is selected to compensate for the inductance of the balun improving the low frequency response of the directional coupler.

19. The system of claim 16 wherein $R_C$ equals the characteristic impedance of transmission lines used to connect and carry the electromagnetic energy to and from the coupler.

20. The system of claim 19 wherein $R_B=N\times R_C$, and $R_A=R_C\div N$, where "N" is a design parameter and determines tap loss.

* * * * *